United States Patent [19]
Nanba et al.

[11] Patent Number: 5,739,772
[45] Date of Patent: Apr. 14, 1998

[54] NAVIGATION SYSTEM FOR VEHICLES

[75] Inventors: Akimasa Nanba, Anjo; Shigehito Takahashi, Tokyo, both of Japan

[73] Assignees: Aisin AW Co., Ltd.; Alpine Co., Ltd., both of Japan

[21] Appl. No.: 689,971

[22] Filed: Aug. 16, 1996

[30] Foreign Application Priority Data

Aug. 25, 1995 [JP] Japan .................................. 7-217865

[51] Int. Cl.[6] .................................................. G08G 1/123
[52] U.S. Cl. ........................ 340/990; 340/988; 340/995; 364/449.3; 364/449.5
[58] Field of Search .............................. 340/988, 990, 340/995; 364/449.2, 449.3, 449.5

[56] References Cited

U.S. PATENT DOCUMENTS

| | | | |
|---|---|---|---|
| 5,031,104 | 7/1991 | Ikeda et al. | 364/449.5 |
| 5,206,811 | 4/1993 | Itoh et al. | 364/449.5 |
| 5,272,638 | 12/1993 | Martin et al. | 364/449.5 |
| 5,371,497 | 12/1994 | Nimura et al. | 340/995 |
| 5,422,812 | 6/1995 | Knoll et al. | 340/995 |
| 5,430,655 | 7/1995 | Adachi | 340/990 |
| 5,537,323 | 7/1996 | Schulte | 364/449.5 |

FOREIGN PATENT DOCUMENTS

| | | |
|---|---|---|
| 0703434 | 3/1996 | European Pat. Off. . |
| 4035979 | 6/1991 | Germany . |
| 4118603 | 12/1991 | Germany . |
| 9606326 | 2/1996 | WIPO . |

OTHER PUBLICATIONS

Proceedings of the Vehicle Navigation & Information Systems Conference, Oct. 12–15, 1993 pp. 419–422.

*Primary Examiner*—Brent A. Swarthout
*Attorney, Agent, or Firm*—Lorusso & Loud

[57] ABSTRACT

The present invention provides a navigation system for vehicles, in which advancing direction guidance information at a first guide branch point is displayed by partially overlapping it on advancing direction guidance information at a second guide branch point, and it is possible to recognize that the information at the uppermost layer has higher priority and also to find two advancing direction guidances at the same time. The advancing direction guidance information at a second guide branch point is displayed only when there are two or more guide branch points separated from each other at shorter distance than a predetermined distance, and the driver can easily recognize that the branch points requiring guidance are located adjacent to each other and can drive the vehicle at ease and with full confidence.

8 Claims, 11 Drawing Sheets

FIG. 4(A)
Guidance road data

| No. of roads (n) | |
|---|---|
| 1 | Road number |
| | Length |
| | Road attribute data |
| | Configuration data address & size |
| | Guidance data address & size |
| ⋮ | |
| n | |

FIG. 4(B)
Configuration data

| No. of nodes (m) | |
|---|---|
| 1 | East longitude |
| | North latitude |
| ⋮ | |
| m | |

FIG. 4(C)
Guidance data

| Intersection name |
|---|
| Precaution point data |
| Road name data |
| Road name audio data address & size |
| Destination data address & size |

FIG. 4(D)
Destination data

| No. of destinations (k) | |
|---|---|
| 1 | Destination road number |
| | Destination name |
| | Destination name audio data address & size |
| | Destination direction data |
| | Traveling guidance data |
| ⋮ | |

FIG. 4(E)
Destination direction data

−1 : Invalidity
 0 : Not necessary
 1 : Straight ahead
 2 : Rightward direction
 3 : Diagonally rightward direction
 4 : Direction to return to right
 5 : Leftward direction
 6 : Diagonary leftward direction
 7 : Direction to return to left

FIG. 5(A)

Road attribute data

Yes/no information Yes: O

| | | |
|---|---|---|
| Overpass/ underpass data | Overpass | |
| | Road alongside overpass | |
| | Underpass | O |
| | Road alongside underpass | |
| No. of lanes | 3 lanes or more | |
| | 2 lanes | O |
| | 1 lane | |
| | No centerline | |

FIG. 5(B)

Road name data

| Road type | In-type number |
|---|---|

| | | |
|---|---|---|
| Expressway | Main line | 1 |
| | Ancillary road | 2 |
| Municipal expressway | Main line | 3 |
| | Ancillary road | 4 |
| Toll road | Main line | 5 |
| | Ancillary road | 6 |
| General road { | National road | 7 |
| | Prefectural road | 8 |
| | Others | 9 |

FIG. 6(A)

Precaution point data

| Railroad crossing | ○ |
|---|---|
| Tunnel entrance | |
| Tunnel exit | |
| Road width reduced point | |
| No suggestion | |

FIG. 6(B)

Traveling guidance data

| Bear right | |
|---|---|
| Bear left | |
| Bear towar | ○ |
| No suggestion | |

2nd branch point is near

FIG. 10(b)

2nd branch point is far

NAVIGATION SYSTEM FOR VEHICLES

BACKGROUND OF THE INVENTION

The present invention relates to a navigation system for vehicles, in which marks such as arrows are displayed to indicate advancing direction at guide branch points on a suggested route or an arrow to indicate advancing direction at a guide branch point (hereinafter referred as "guide branch point").

A navigation system for vehicles mounted on an automobile and used for providing guidance for a route is known in the past, in which data of places such as the destination, transit points, etc. are input to search a route from the present position or a starting point of a vehicle, and the searched route is displayed on a map. An arrow to indicate advancing direction is displayed on an enlarged view.

Figure 1:
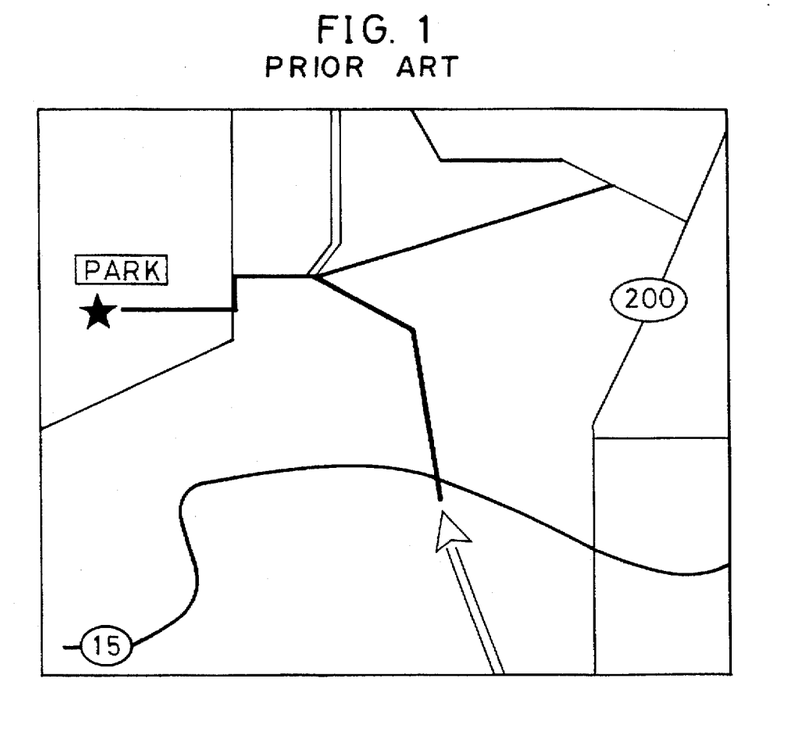
FIG. 1 is an example of prior art of a map display screen with a leading route highlighted thereon.

FIG. 1 shows a route leading to a destination "*" (park) through a highway indicated by double and thick lines displayed on a map.

Figure 2:
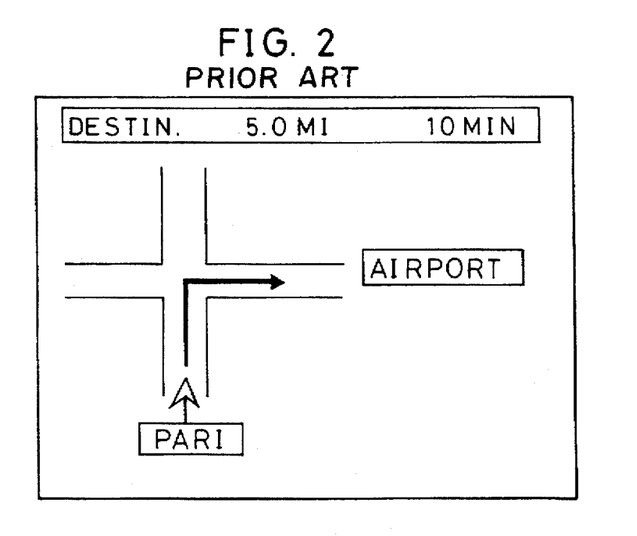
FIG. 2 shows a screen display of an enlarged view of the vicinity of a guide branch point in a prior art example.

FIG. 2 is an enlarged view of the vicinity of a guide branch point of a route leading from PARI to Airport, where an arrow indicating the advancing direction at a guide branch point and a sign "5.0 miles or 10 minutes to the destination" are displayed.

In the conventional type system as described above, the route is drawn on the map as shown in FIG. 1. The driver must judge a turning point and a turning direction by watching this map, and it often takes considerable time to have full understanding of the situation. Also, when the map is enlarged as shown in FIG. 2, the second next guide branch point is out of the area displayed on the screen, and this causes inconvenience for the driver because it is not possible to find out a turning direction on the route ahead of the approaching guide branch point.

To solve this problem, proposals have been made to display two advancing directions with respect to adjacent intersections on the guidance route. However, in simply indicating two advancing directions, it is not easy to judge which of the advancing directions should be chosen, and it is difficult to identify the next advancing direction.

It is an object of the present invention to provide a navigation system, by which it is possible to provide guidance in such manner that the driver can drive the vehicle to the destination with full confidence and at ease.

It is another object of the present invention to provide a navigation system, in which advancing directions at the two next guide branch points are displayed in easily recognizable manner.

It is still another object of the present invention to provide a navigation system, in which guidance information for a plurality of advancing directions is displayed in such manner that priority of the advancing direction can be easily recognized.

It is still another object of the invention to provide a navigation system, in which it can be easily recognized by the guidance of advancing direction that the vehicle has come closer to the destination.

SUMMARY OF THE INVENTION

The navigation system for vehicles according to the present invention comprises a guidance control means for displaying guidance information on advancing directions at a first guide branch point by overlapping it on guidance information on advancing direction at a second guide branch point. Further, there is provided a judging means for judging whether a distance between a branch point where guidance is needed next and the next guide branch point is within a given value, and only when it is judged that the distance between the guide branch points is within a given value, guidance information for advancing direction at the next guide branch point is displayed. Also, the guidance control means displays guidance information on advancing direction at a first guide branch point and also displays the guidance on advancing directions to the destination on top of the others, i.e. the information at the nearer guide branch point displayed on an upper layer.

DESCRIPTION OF THE PREFERRED EMBODIMENTS

In the following, description will be given on embodiments of the present invention referring to the drawings.

Figure 3:
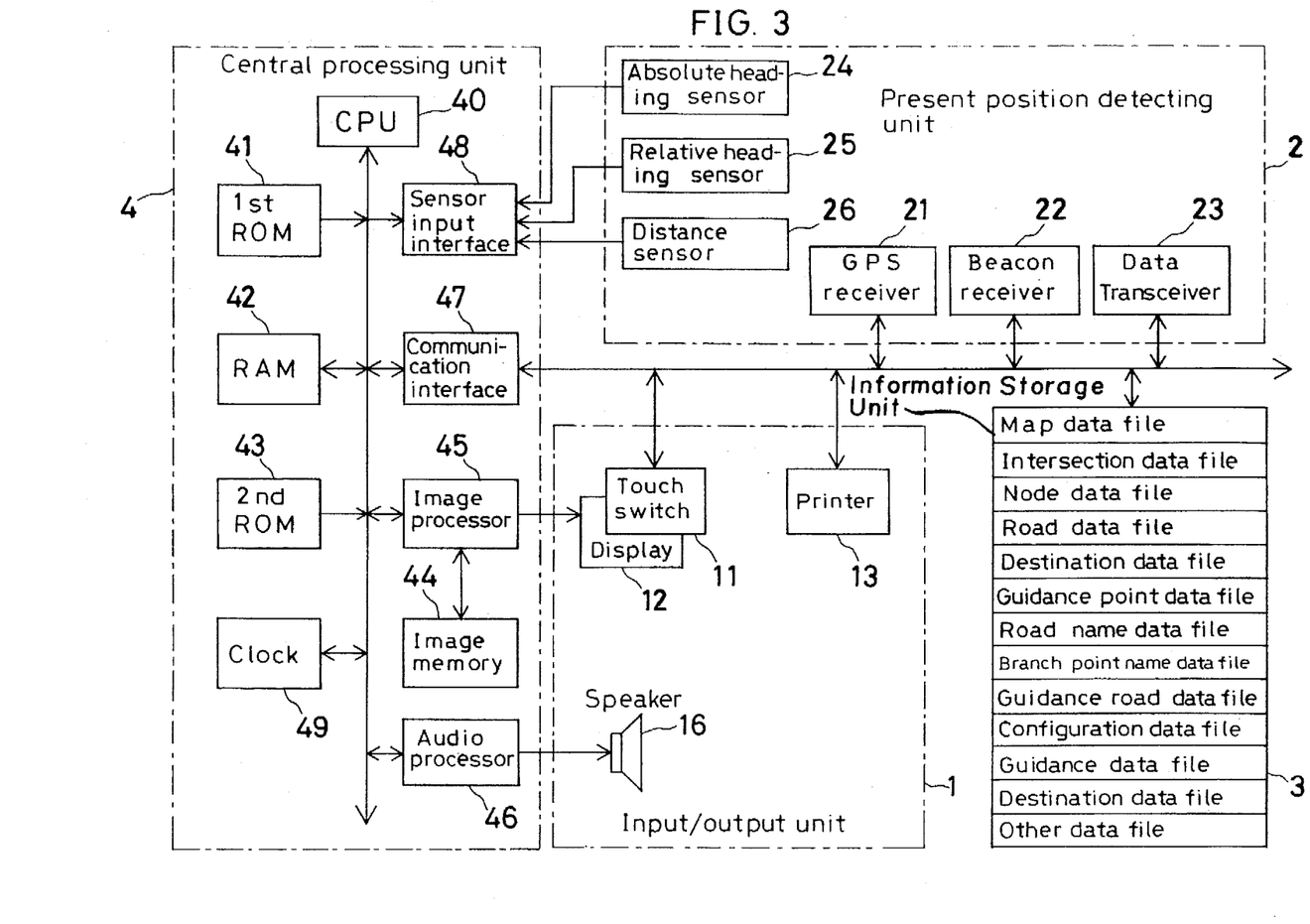
FIG. 3 is a block diagram of a navigation system according to the present invention.

FIG. 3 represents an example of an arrangement of a navigation system according to the present invention. The navigation system according to the present invention comprises, as shown in FIG. 3, an input/output unit 1 for inputting and outputting information relating to route guidance, a present position detecting unit 2 for detecting information relating to the present position of the vehicle, an information storage unit 3 for storing navigation data necessary for calculating an optimal route or display guidance data necessary for guidance, and a central processing unit 4 for route search processing and display guidance processing necessary for route guidance and for controlling the entire system.

The input/output unit 1 instructs navigation processing to the central processing unit 4 to input destination data at the intention of the driver so that guidance information can be output in voice and/or on screen when the driver needs such information and to print out the data after the processing. As the means to execute the functions, the input unit comprises a touch switch 11 or an operation switch to input the destination using telephone number or coordinates on map or to request route guidance. The output unit comprises a display unit 12 for displaying the inputted data on screen or for displaying route guidance automatically on screen at the request of the driver, a printer 13 for printing out the data processed by the central processing unit 4 or the data stored in the information storage unit 3, and a speaker 16 for outputting the route guidance information by voice.

In this case, it is also possible to add a voice recognizing device for outputting in voice or a card reader for reading data recorded on IC card or magnetic card. Also, it is possible to add a data communication device, which stores data necessary for navigation and exchanges data to and from an information center where data necessary for navigation is stored and is offered via communication line at the request of the driver or to and from an information source such as electronic notebook where data specific to the driver such as map data, destination data, etc. are stored in advance.

The display unit 12 comprises a color CRT or a color liquid crystal display, and all screens necessary for navigation such as target name input screen, route setting screen, sector view screen, intersection view screen, and direction guidance screen at branch point such as intersection are outputted in color display based on map data and guidance data processed by the central processing unit 4, and buttons are displayed on the screen for setting the route guidance or for switching over guidance or screen during route guidance. In particular, transit intersection information such as names of transit intersections is given in pop up color display on the sector view screen when necessary.

This display unit 12 is installed on an instrument panel near the driver's seat. By watching the sector view, the driver can confirm the present position of the vehicle and can obtain information on the route ahead. The display unit 12 is provided with a touch panel 11 to match the display of functional buttons. By touching the button, the above operation is executed based on the input signal. The input signal generating means comprising this button and the touch switch constitutes the input unit, but detailed description is not given here.

The present position detecting unit 2 is provided with a GPS receiver 21 utilizing global positioning system (GPS), a beacon receiver 22, a data transceiver for receiving compensation signal of GPS utilizing cellular phone (automobile phone) or FM multiplex signal, an absolute heading sensor 24 comprising a geomagnetic sensor, a relative heading sensor 25 comprising wheel sensor, steering sensor, gyro, etc. and a distance sensor 26 for detecting traveled distance from the number of revolutions of the wheels.

The information storage unit 3 is a data base where all necessary data for navigation system are recorded and comprises files such as map data, intersection data, node data, road data, photograph data, registered point data, guidance point data, destination data, telephone number data, address data, etc.

The central processing unit 4 comprises a CPU 40 for executing various computation processings, a first ROM 41 contains programs to execute processing such as route searching and programs for display output control necessary for route guidance and for audio output control necessary for audio guidance and necessary data, a RAM 42 for temporarily storing route guidance information searched such as coordinates, road surface code No., etc. of the preset destination and data under computation, a 2nd ROM 43 for storing display information data necessary for route guidance and map display, an image memory 44 for storing image data used for screen display on the display unit, an image processor 45 for picking up the image data from the image memory 44 based on the display output control signal from the CPU 40 and for outputting it to the display unit after image processing, an audio processor 46 for synthesizing voice, phrase, a sizable sentence, sound, etc. read from the information storage unit 3 based on the audio output control signal from the CPU and for outputting them to the speaker 16 after converting to analog signals, a communication interface 47 for sending and receiving input/output data by communication, a sensor input interface 48 for incorporating sensor of the present position detecting unit 2, and a clock 49 for recording date and time to internal dialog information. Here, route guidance is carried out by screen display and audio output, and the driver can select whether the data should be provided in audio output or not.

Figure 4A:
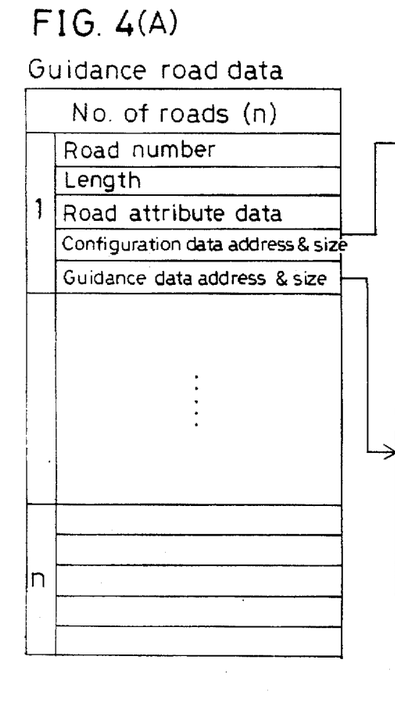
FIGS. 4(A)–(E) illustrate major data files utilized in the present invention.
Figure 4B:
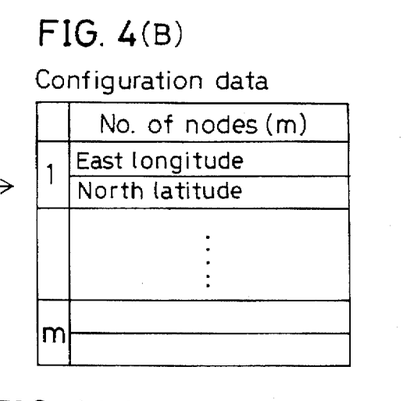
Figure 4C:
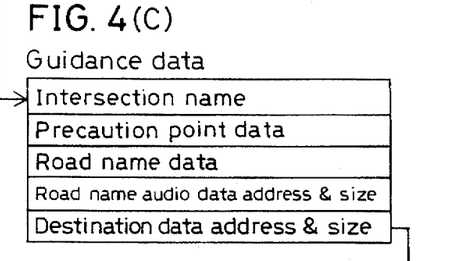
Figure 4D:
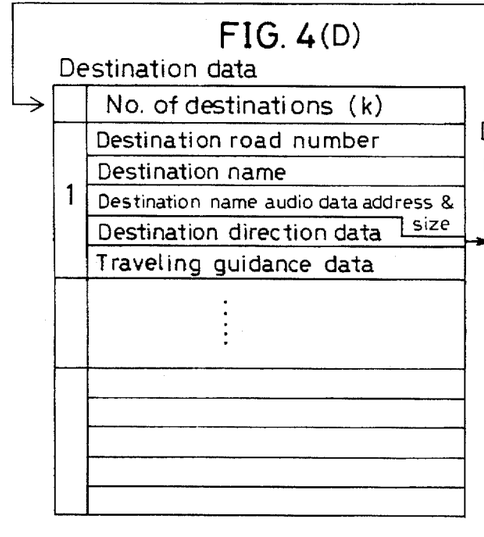
Figure 4E:
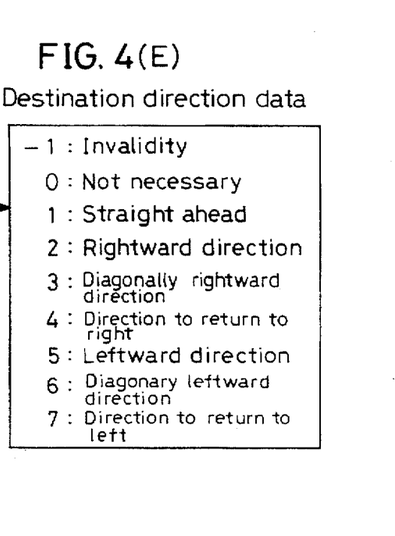
Figure 5A:
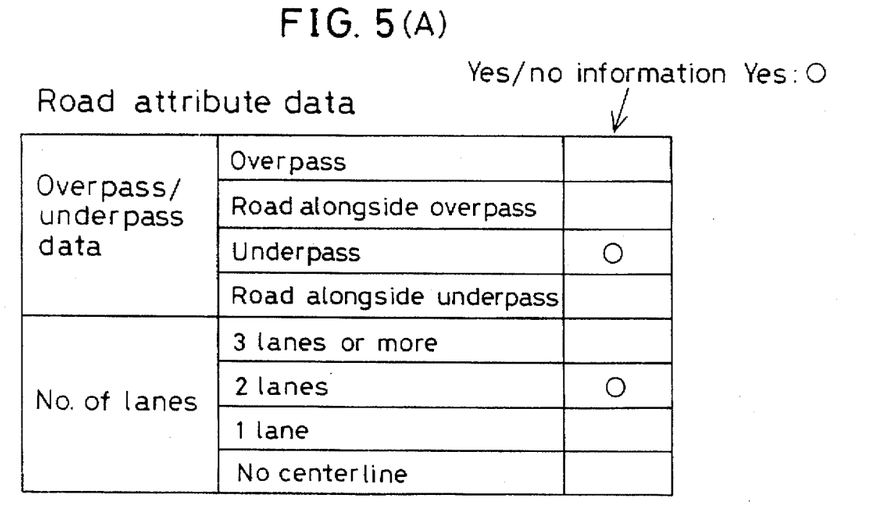
FIGS. 5(A) and 5(b) illustrate additional major data files utilized in the present invention.

FIGS. 4(A), 4(B), 4(C), 4(D), 4(E), 5(A), 5(B), 6(A) and 6(B) show an arrangement example of major data files stored in the information storage unit 3 of the present invention shown in FIG. 3. FIG. 4(A) represents a guidance road data file where data necessary for calculating a route by a route calculating means and for providing route guidance are stored. In each of the number of roads (n), there are provided data such as road number, length, road attribute data, address and size of configuration data, and address and size of guidance data. The road number is set for each direction (outward course and return course) for each road between branch points. The road attribute data serving as auxiliary information data for road guidance are the data, as shown in FIG. 5(A), showing that the road is an overpass, a road alongside an overpass, an underpass, or a road alongside underpass, and also providing information of the number of lanes. The configuration data has, as shown in FIG. 4(B), coordinate data comprising east longitude and north latitude of each of several nodes m when each road is divided into a plurality of nodes.

Figure 5B:
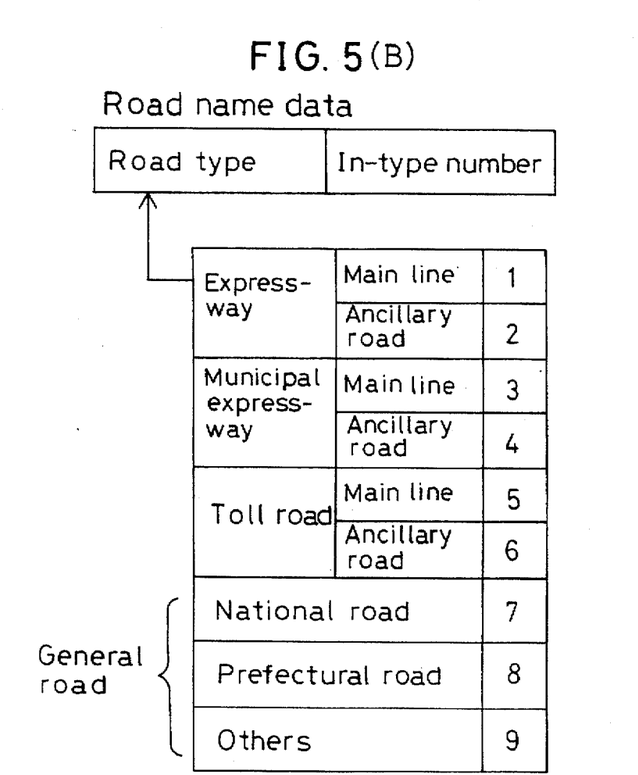
Figure 6A:
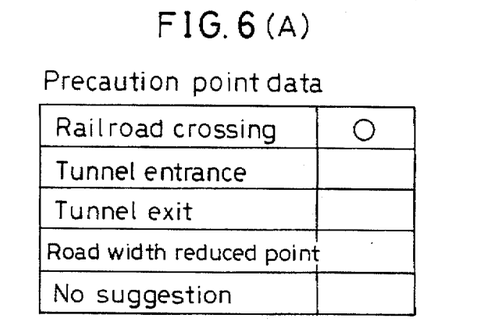
FIGS. 6(A) and 6(B) illustrate other major data files utilized in the present invention.
Figure 6B:
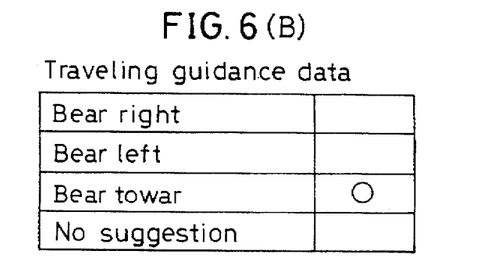

The guidance data comprises, as shown in FIG. 4(C), intersection (or branch point) name, precaution point data, road name data, address and size of road name audio data, and address and size of destination data. The precaution point data are the data indicating information such as railroad crossing, tunnel entrance, tunnel exit, road width reduced point, or no suggestion as shown in FIG. 6(A). These are the data to warn the driver of precaution points such as railroad crossing, tunnel, etc. other than branch points. The road name data are, as shown in FIG. 5(B), the data to indicate road type information such as expressway, municipal expressway, toll road, general road (national road, prefectural road, and others) and also information indicating whether expressway, municipal expressway or toll road is a main line or an approach (ancillary) road. It comprises road type data and in-type number, which is individual number data for each road type.

The destination data comprises, as shown in FIG. 4(D), destination road number, destination name, address and size of destination name audio data, destination direction data, and traveling guidance data.

Figure 7:
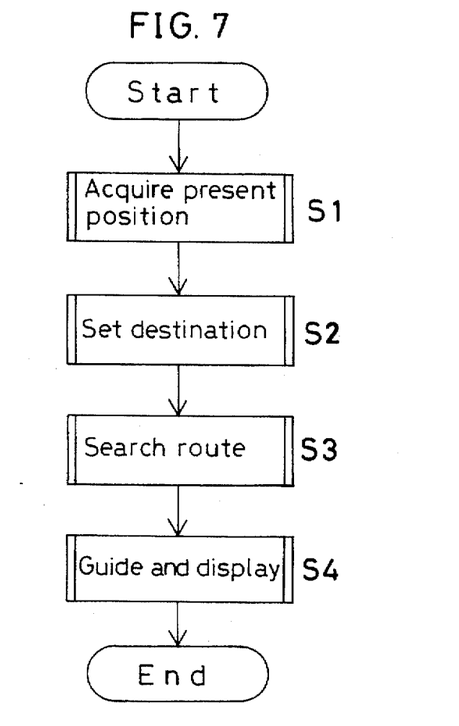
FIG. 7 is a flow chart of a main routine for control operations in accordance with the present invention.

Next, description will be given on a flow of processing of the navigation system for vehicles of the present invention. FIG. 7 is a flow chart for explaining a flow of the entire navigation system of the present invention.

When the program of route guidance system is started by CPU 51 of the central processing unit 4, the present position of the vehicle is detected by a present position detecting unit 2, and a map of the vicinity of the present position is displayed. Also, the name and other data of the present position are displayed (Step S1). Next, a destination is set using target name, telephone number, address, registered point, etc. of the place or the facility (Step S2), and an optimal route from the present position to the destination is searched (Step S3). When the route has been determined, the present position is traced by the present position detecting unit 2, and route guidance and display are repeatedly performed until the vehicle reaches the destination (Step S4). In the present invention, the destination direction data (FIG. 4(E) in the destination data file FIG. 4(D)) stored in the information storage unit 3 is read in Step S4 and guidance for two advancing directions at the adjacent guide branch points is displayed. In this case, displaying the second advancing direction guidance is changed and it is displayed according to the advancing direction at the first guide branch point. In case it is newly set to take an additional course out of the suggested route before reaching the destination, a search area is set, and re-searching is performed in the search area. Then, route guidance is repeatedly provided until the vehicle reaches the destination.

Figure 8:
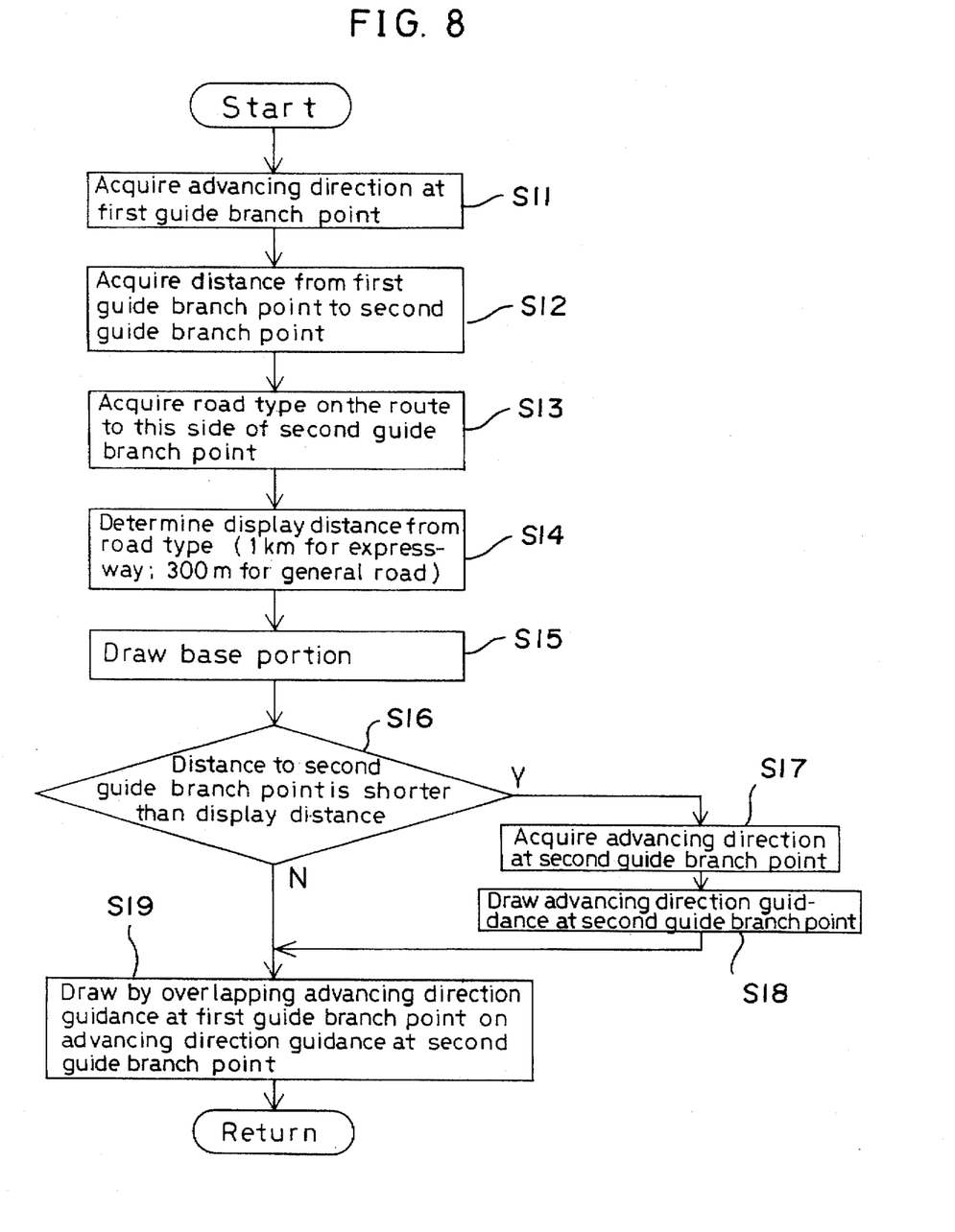
FIG. 8 is a flow chart of a subroutine for drawing a sector view.
Figure 9A:
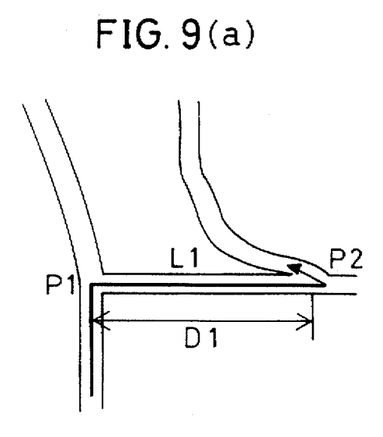
FIGS. 9(a) and 9(b) illustrate different possible routes to be followed direction.
Figure 9B:
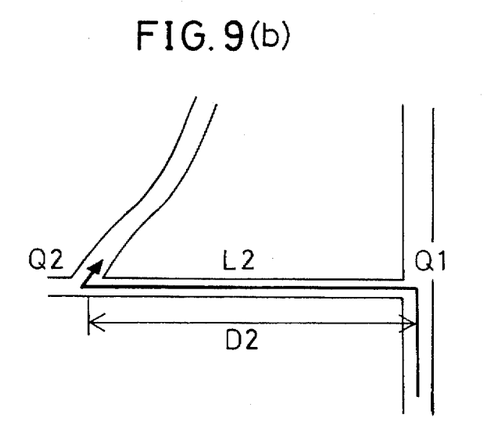
Figure 10A:
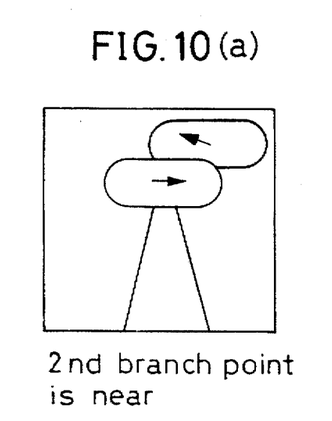
FIGS. 10(a) and 10(b) show advancing direction information displayed on guidance screens for the corresponding routes of FIGS. 9(a) and 9(b); screens.
Figure 10B:
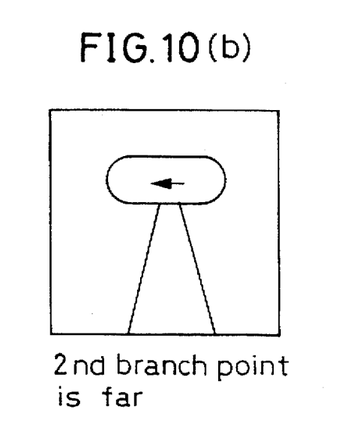

FIG. 8 is a flow chart of processing to draw a sector view to display the advancing directions in the present invention, FIGS. 9(a) and 9(b) illustrate different possible routes to follow, and FIGS. 10(a) and 10(b) show the advancing direction indicators on guidance display screens for the respective routes of FIGS. 9(a) and 9(b).

Description is now given on the following two cases: a case as shown in FIG. 9(a) where there is a second guide branch point P2 at a position at a near distance D1 from a first guide branch point P1 and the route is turned in rightward direction at the guide branch point P1 and in leftward direction at the guide branch point P2 as shown by the thick line and arrow in FIG. 9(a), and a case shown in FIG. 9(b) where there is a second guide branch point Q2 at a position at a long distance D2 from a first guide branch point Q1 and the route is turned in leftward direction at the guide branch point Q1 and in rightward direction at the guide branch point Q2.

In the processing of FIG. 8 in step S11, advancing direction at the first guide branch point (P1 or Q1) is acquired from the destination direction data (FIG. 4(E)) of the destination data shown in FIG. 4(D) as stored in the information storage unit. Next in step S12, from the guidance road data of FIG. 4 (A), a distance (D1 or D2) from the first guide branch point to the second guide branch point is acquired. Also, for the roads (L1 or L2) running to this side of the second guide branch point, road type, i.e. whether it is a general road or an expressway, is acquired in step S13 from the road name data of FIG. 5(B). Then, a display distance is determined according to road type. The display distance is, for example, 1 km in case of expressway and 300 m in case of general road, and it is a preset distance necessary for deciding whether two advancing directions should be displayed or not.

Next, base portion such as road is drawn in step S15 and it is judged whether the distance (D1 or D2) to the second guide branch point is shorter than the display distance or not in step S16. For example, in case the distance D1 is short as shown in FIG. 9(a) and the guide branch point P2 is within the display distance, advancing direction at the second guide branch point P2 is acquired in step S17 from the destination direction data (FIG. 4(E)) of the destination data shown in FIG. 4 (D) as stored in the information storage unit, and it is drawn on a given area. Partially overlapping on this area, the advancing direction at the first guide branch point P1 is then drawn in step S19 on a given area (FIG. 10(a)). On the other hand, in case the distance D2 is long as shown in FIG. 9(b) and the guide branch point Q2 is beyond the display distance, only the advancing direction at the first guide branch point Q1 is drawn in step S19 on a given area (FIG. 10(b)).

As described above, the advancing direction guidance information at the first guide branch point is displayed by overlapping on the advancing direction guidance information at the second guide branch point, and it is easily recognized that the information on top of the others, i.e. on the uppermost layer, has higher priority. Accordingly, the next advancing direction guidance can be easily recognized and it is also possible to simultaneously recognize the next advancing direction guidance. Only when the branch points requiring guidance are located adjacent to each other, both the advancing direction guidance at the next guide branch point and the advancing direction guidance at the second next guide branch point can be output. Therefore, the user can easily recognize that the branch points requiring guidance are adjacent to each other, and the driver can drive the vehicle at ease and with full confidence.

Next, description will be given on an example where advancing direction guidances to the destination are sequentially overwritten referring to FIG. 11 and FIG. 12.

Figure 11:
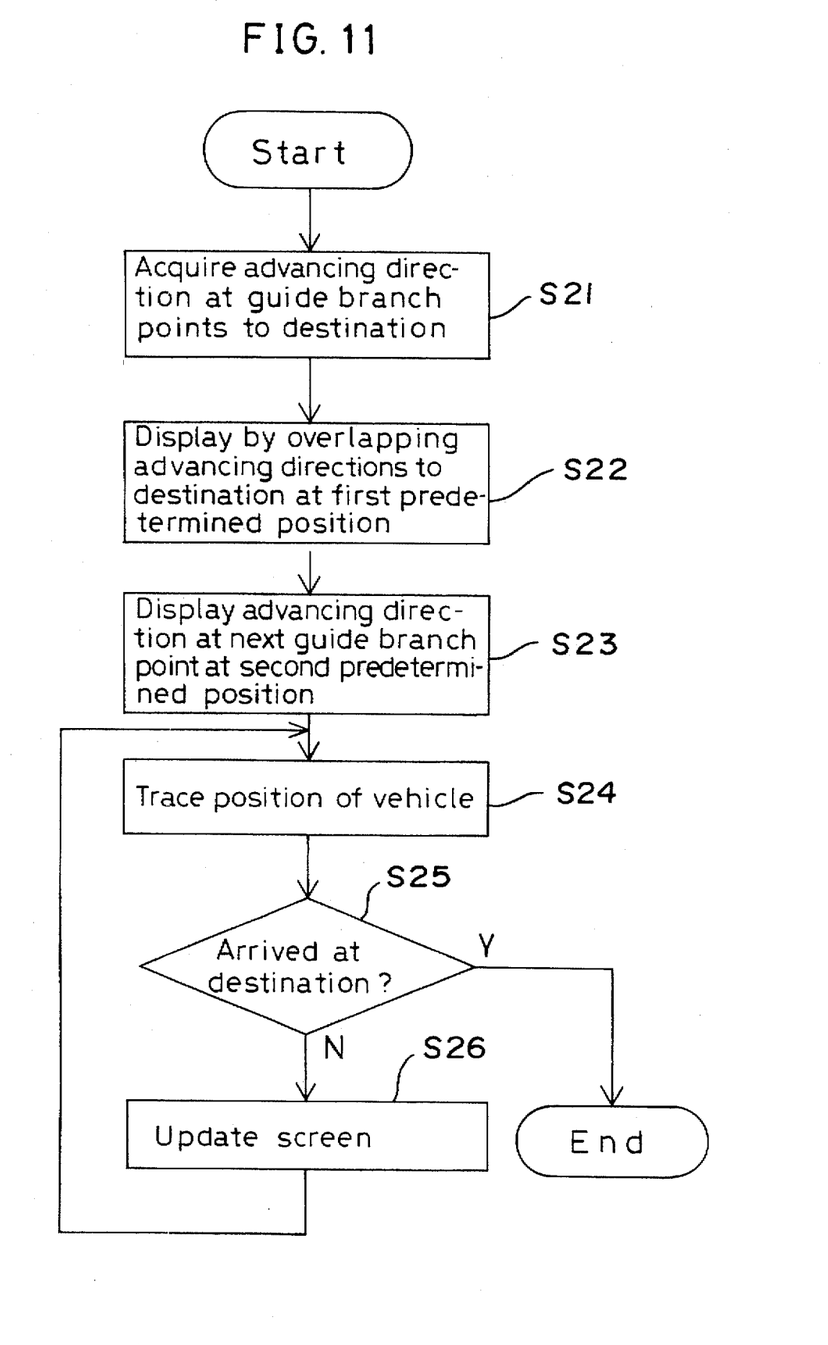
FIG. 11 is a flow chart of another subroutine for drawing a sector view.
Figure 12:
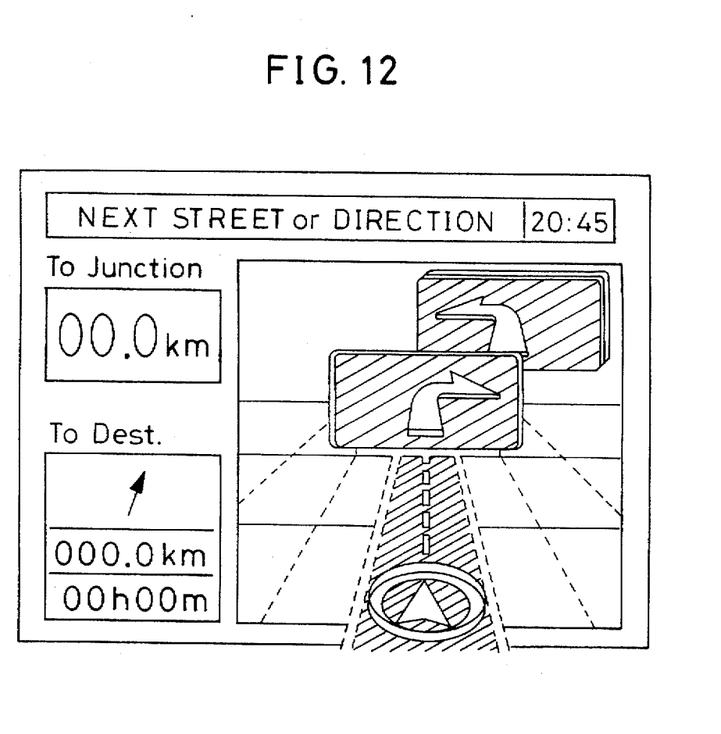
FIG. 12 illustrates an example of a guidance display screen.

FIG. 11 is a flow chart of processing to display advancing direction guidance, and FIG. 12 shows a screen displayed by this display processing.

In step S21 of FIG. 11, advancing directions at all guide branch points to the destination are acquired from the destination direction data (FIG. 4(E)) of the destination data shown in FIG. 4(D) as stored in the information storage unit, and data of the second and subsequent guide branch points are displayed in step S22 at a first predetermined position by overwriting in layers with the advancing direction at the second guide branch point following the nearest guide branch point to the present position placed on the uppermost layer. By this processing, in the example of FIG. 12, the advancing direction in the uppermost layer is shown by a left turn mark as given at the upper right of the display screen, and marks of advancing directions at the subsequent guide branch points are hidden for being sequentially displayed under the top layer. The road is displayed at the center of the screen, and the present position is indicated by a mark of a triangle encircled by a circle.

Next in step S23, the advancing direction at the next or first guide branch point is displayed at a second predetermined position. By this processing, a right turn arrow mark of the next guide branch point is displayed at the upper center of the screen in the example of FIG. 12, and the mark of right turn arrow for guiding the advancing direction at the next guide branch point is displayed by partially overlapping on the mark of the left turn arrow. By the present position detecting unit, the position of the vehicle is traced in step S24, and it is judged in step S25 whether the vehicle reached the destination or not. Until the vehicle reaches the destination, each time it is detected that the vehicle has passed through a guide branch point, the screen is updated in step S26, and advancing direction guidance marks for the next guide branch point and the guide branch point after the next are newly displayed. The updating of the screen is performed, for example, as follows: the advancing direction mark at the second predetermined position is erased, and the advancing direction mark for the next guide branch point (formerly the second guide branch point) is newly displayed at the second predetermined position, and the advancing direction mark for the new second guide branch point is displayed at the first predetermined position at the same time.

In the example of FIG. 12, the advancing direction marks at the guide branch points are overlapped in layers up to the destination. By counting number of the layers on the screen, it is possible to find out the number of the guide branch points through which the vehicle should pass. Therefore, by counting the number of the remaining layers of the advancing direction marks, it is possible to recognize that the number of turnings ahead has decreased as the vehicle comes closer to the destination. When the number of the advancing direction marking is turned to one, information (marking) of the destination is finally displayed, and when the vehicle arrives at the destination, the processing to display advancing direction guidance is completed. Accordingly, by finally indicating the information of the destination, it is possible to reach the destination without any further guidance information.

Next, description will be given on advancing direction display when there is a guide branch point in the intersection screen, referring to FIG. 13 and FIG. 14.

Figure 13:
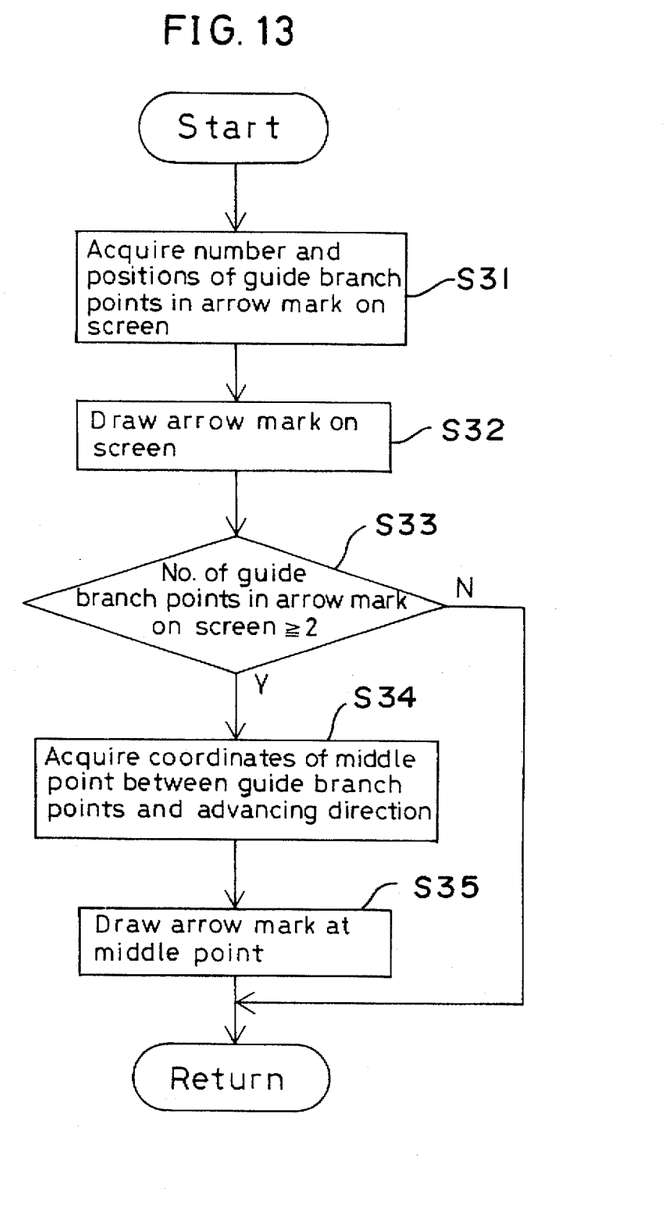
FIG. 13 is a flow chart of yet another subroutine for drawing a sector view.
Figure 14:
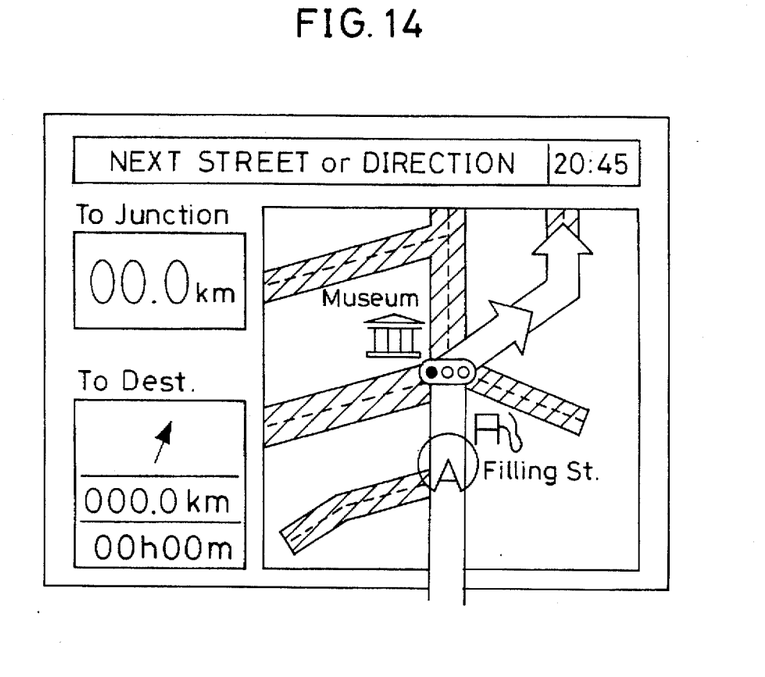
FIG. 14 illustrates another example of a guidance display screen.

FIG. 13 is a flow chart of processing to draw in case advancing direction arrows at the first and the second guide branch points are separately displayed, and FIG. 14 shows an intersection screen.

As shown in FIG. 14, in case two or more guidance displays to indicate the advancing directions are given when an intersection screen is displayed, number and positions of guide branch points are acquired in step S31 from the guidance road data and guidance data of FIGS. 4(A) and (C) as stored in the information storage unit, and for example, an arrow mark is drawn on the screen in step S32. This arrow mark is drawn along the leading route. If in step S33 there are two or more guide branch points in the arrow mark thus drawn, the advancing direction guidance information is divided and is drawn separately. Specifically, coordinates of the middle point between the guide branch points are obtained in step S34, and heading is acquired from the destination direction data (FIG. 4(E)) of the destination data shown in FIG. 4(D), and the arrow mark is drawn in step S35 at the middle point. As a result, as shown in FIG. 14, the arrow marks are drawn separately. This makes it possible to understand the advancing direction more easily and to provide more reliable guidance.

What we claim is:

1. A navigation system for vehicles, comprising present position detecting means for calculating a present position of a vehicle;

input means for inputting information necessary for calculating a route;

display means for displaying information for route guidance;

information memory means for storing all data necessary for providing route guidance including guidance road data;

route calculating means for calculating the route based on the information inputted by said input means;

route information memory means for storing information of the route calculated by the route calculating means;

means for reading the route information stored in the route information memory means and for outputting the route information to said display means;

guidance control means for reading an advancing direction at a first guide branch point being approached and an advancing direction at a second guide branch point being approached after the first guide branch point from said route information memory means based on the route calculated by said route calculating means and the present position detected by said present position detecting means and for outputting information of the read advancing directions at the first and second guide branch points including directional arrows indicative of respective advancing directions to said display means; and said guidance control means displaying the information of the advancing direction at the first guide branch point by partially overlapping it on the information of the advancing direction at the second guide branch point so that at least the heads of each arrow are simultaneously visible on said display means.

2. A navigation system for vehicles according to claim 1, wherein there is further provided a judging means for judging whether a distance between the first guide branch point and the second guide branch point is within a predetermined value or not, and said guidance control means displays the information of the advancing direction at the second guide branch point only in case it is judged by said judging means that the distance between the first and second guide branch points is within the predetermined value.

3. A navigation system for vehicles according to claim 1, wherein said guidance control means displays multiple overlapping layers of information of advancing direction at guide branch points from the second guide branch point up to the destination with the information of the advancing direction at the second guidance branch point at an uppermost layer of the multiple overlapping layers.

4. A navigation system for vehicles according to claim 1, wherein said guidance control means outputs information of the destination to said display means after the vehicle has passed through a final guide branch point.

5. A navigation system for vehicles according to claim 1, wherein said guidance control means displays guidance marks along a leading route under the condition that there are guide branch points on the display screen.

6. A navigation system for vehicles according to claim 5, wherein said guidance control means displays guidance marks separately in case there are two or more guide branch points in the guidance marks displayed along the leading route.

7. A navigation system for vehicles according to claim 1 wherein the information of the advancing directions at the first and second guide branch points includes respective arrows pointing in the respective directions of advancement through the guide branch points as the respective branch points are approached.

8. A navigation system for vehicles according to claim 7 wherein the information of the advancing directions includes windows containing the respective arrows wherein the window for the advancing direction at the first guide branch point partially overlaps the window for the advancing direction at the second guide branch point.

* * * * *

UNITED STATES PATENT AND TRADEMARK OFFICE
CERTIFICATE OF CORRECTION

PATENT NO. : 5,739,772
DATED : April 14, 1998
INVENTOR(S) : NANBA et al

It is certified that error appears in the above-indentified patent and that said Letters Patent is hereby corrected as shown below:

Col. 2, line 33, "posible" should read --possible--.

Col. 4, line 35, after "side" insert --an--.

Col. 5, line 53, after "type" insert --in step S14--; and
       line 67, after "area" insert --in step S18--.

Col. 6, line 54, delete "next"; and
       line 55, after "the", first instance, insert --next--.

Signed and Sealed this

Twenty-second Day of December, 1998

Attest:

BRUCE LEHMAN

*Attesting Officer*    *Commissioner of Patents and Trademarks*